United States Patent
Wartelski et al.

(10) Patent No.: US 10,619,627 B2
(45) Date of Patent: Apr. 14, 2020

(54) METHOD FOR CONTROLLING THE TEMPERATURE OF AN ELECTRIC PROPULSION SYSTEM

(71) Applicant: AIRBUS DEFENCE AND SPACE SAS, Toulouse (FR)

(72) Inventors: Matias Wartelski, Toulouse (FR); Xavier Sembély, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/314,649

(22) PCT Filed: Jul. 6, 2017

(86) PCT No.: PCT/EP2017/066972
§ 371 (c)(1),
(2) Date: Dec. 31, 2018

(87) PCT Pub. No.: WO2018/007540
PCT Pub. Date: Jan. 11, 2018

(65) Prior Publication Data
US 2019/0331099 A1    Oct. 31, 2019

(30) Foreign Application Priority Data
Jul. 7, 2016  (FR) ..................... 16 56529

(51) Int. Cl.
*F03H 1/00* (2006.01)
*G01K 7/36* (2006.01)
*G01K 7/42* (2006.01)

(52) U.S. Cl.
CPC ......... *F03H 1/0031* (2013.01); *F03H 1/0075* (2013.01); *G01K 7/36* (2013.01);
(Continued)

(58) Field of Classification Search
CPC .. F03H 1/00–0093; B64G 1/405; B64G 1/406
See application file for complete search history.

(56) References Cited

U.S. PATENT DOCUMENTS

| | | | |
|---|---|---|---|
| 2011/0062899 A1* | 3/2011 | Marchandise | ........ F03H 1/0031 315/507 |
| 2013/0125526 A1* | 5/2013 | Marchandise | ........ F03H 1/0031 60/202 |
| 2018/0023550 A1* | 1/2018 | Tsay | ...................... F03H 1/0031 60/202 |

FOREIGN PATENT DOCUMENTS

| | | |
|---|---|---|
| CN | 103 471 738 A | 12/2013 |
| CN | 105027016 A | 11/2015 |

(Continued)

OTHER PUBLICATIONS corresponding Chinese Office Action of Aug. 2, 2019 and English Translation of same.

*Primary Examiner* — Gerald L Sung
*Assistant Examiner* — William L Breazeal
(74) *Attorney, Agent, or Firm* — Im IP Law; Chai Im; C. Andrew Im

(57) ABSTRACT

A method for controlling the temperature of an electric propulsion system. The electric propulsion system includes a discharge channel, an anode, a cathode, an injection system and a magnetic circuit. The injection system injects propellant gas into the discharge channel and the magnetic circuit has at least one magnetic winding to generate a magnetic field in the discharge channel. The temperature at a reference thermal point of the electric propulsion system is determined. The electric propulsion system is heated by the Joule effect by applying a current to the magnetic circuit when the determined temperature is below a minimum temperature predetermined during a stop phase of the electric propulsion system.

10 Claims, 1 Drawing Sheet

(52) U.S. Cl.
CPC ........... *G01K 7/42* (2013.01); *G01K 2205/00* (2013.01); *G01K 2217/00* (2013.01)

(56) References Cited

FOREIGN PATENT DOCUMENTS

| | | |
|---|---|---|
| FR | 2 973 081 A1 | 9/2012 |
| WO | 2011/135271 A1 | 11/2011 |
| WO | 2016/016563 A1 | 2/2016 |

\* cited by examiner

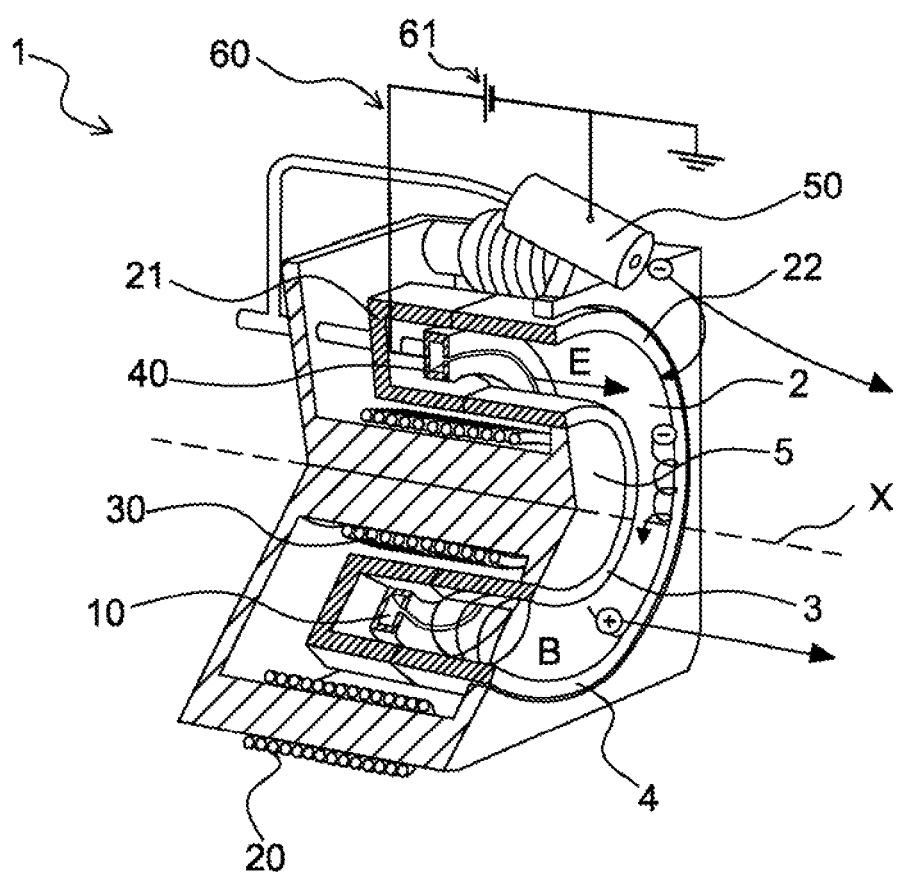

METHOD FOR CONTROLLING THE TEMPERATURE OF AN ELECTRIC PROPULSION SYSTEM

RELATED APPLICATIONS

This application is a § 371 application of PCT/EP2017/066972 filed Jul. 6, 2017, which claims priority from French Patent Application No. 16 56529 filed Jul. 7, 2016, each of which is incorporated herein by reference in its entirety.

FIELD OF THE INVENTION

This invention falls under the field of spatial propulsion. More particularly, this invention relates to an electric propulsion system.

This invention relates to a method for controlling the temperature of the electric propulsion system.

BACKGROUND OF THE INVENTION

Electric propulsion systems are increasingly being used in the field of spatial propulsion, particularly for the steering and orbital control of spacecraft, and more specifically satellites. Indeed, the different available types of electric propulsion systems generally offer higher specific impulse than chemical propulsion systems, thus helping to reduce propellant consumption for the same manoeuvres, with a consequent increase in the service life and/or payload of the satellites.

Among the various types of electric propulsion systems, there are in particular those referred to as electrostatic propulsion systems, wherein the propellant fluid is ionized and directly accelerated by an electric field. The so-called Hall-effect propulsion systems fall in this category.

The electric propulsion systems are subjected to extreme thermal conditions, both when they are in operation (temperatures reach at least 300° C. for the coolest parts) or when they are off (since the electric propulsion systems are positioned on an outer side of satellites, they are in direct contact with cold space).

Since an electric propulsion system is generally qualified for a given range of temperatures, outside this range of temperatures, it may suffer from damage. It is therefore important to control the temperature of the electric propulsion system.

Currently, measuring equipment of the thermistor or thermocouple type, and heating equipment of the electric propulsion system, which can bear such extreme temperatures, are few in number, complex to implement, bulky, heavy and very expensive.

Existing solutions consist of positioning temperature sensors, such as thermistors or thermocouples, and heating equipment for the electric propulsion system, on a support structure linking the electric propulsion system to the satellite structure.

These solutions nevertheless have numerous drawbacks.

Firstly, the temperature sensors and heating equipment of the electric propulsion system are not fixed directly to said electric propulsion system, but via a support structure which has thermal insulation properties. The temperature is therefore measured very indirectly, and therefore, the temperature measured by the temperature sensors is not representative of the temperatures inside the electric propulsion system.

Secondly, as the exact temperature inside the electric propulsion system is not known, the electric propulsion system heating equipment is oversized, particularly to ensure that the electric propulsion system is kept hot enough when it is not running. Such electric propulsion system heating equipment is therefore very energy intensive.

OBJECT AND SUMMARY OF THE INVENTION

This invention aims to remedy all or some of the limitations of the prior art solutions, including those discussed hereinabove, by proposing a simple and economical solution that allows controlling the temperature of an electric propulsion system without the need for external heating equipment.

To this end, the invention relates to a method for controlling the temperature of an electric propulsion system, with said electric propulsion system having a discharge channel, an anode, a cathode, a system for injecting propellant gas in the discharge channel and a magnetic circuit comprising at least one magnetic winding for generating a magnetic field in said discharge channel. The method comprises:
  a step for determining the temperature at a reference thermal point of the electric propulsion system,
  when the determined temperature is below a predetermined minimum temperature during a stop phase of the electric propulsion system, a step of heating said electric propulsion system by the Joule effect, through the application of a current in the magnetic circuit.

A reference thermal point refers to a specific physical area or point of the electric propulsion system at which it is possible to install a temperature sensor, especially during the characterization and/or qualification ground tests, and the temperature of which provides a reliable image of the internal thermal behaviour of the electric propulsion system.

The reference thermal point may be located inside the electric propulsion system or on an area of the outer surface of the electric propulsion system.

When this reference thermal point is located at a connection between the electric propulsion system and a support structure of the electric propulsion system, knowing its temperature also allows characterising the thermal flows exchanged between the electric propulsion system and its support structure, during ground or in-flight tests. In this case, control of the temperature of this reference thermal point is sufficient to simultaneously guarantee, from a thermal point of view, both the proper functioning of the electric propulsion system and satellite areas connected to it.

During the heating step, the applied current is preferably of lower intensity than the intensity of current applied to the magnetic circuit and necessary for generating the propulsion effect of the electric propulsion system.

After such a process, the temperature of electric propulsion system is controlled by means of an internal part of the propulsion system, i.e. the magnetic circuit.

It is thus possible to thermally regulate said electric propulsion system optimally without requiring the addition of external heating equipment.

The method according to the invention can advantageously be implemented in any type of electric propulsion system that uses a magnetic winding for generating the propulsion effect, especially Hall-effect propulsion systems.

In particular embodiments, the process may further comprise one or more of the following characteristics, taken in isolation or in any technically possible combination.

In preferred embodiments, during a phase of operation of the electric propulsion system, when the determined temperature exceeds a predetermined maximum temperature, the propulsion system is temporarily stopped to allow it to cool.

In preferred embodiments, the temperature-determination step can be performed inside or on an area of the outer surface of the electric propulsion system, and comprises:
- a sub-step of applying a current in the magnetic circuit,
- a sub-step of determining the electrical parameters of the electric propulsion system, comprising a sub-step of measuring the voltage in the magnetic circuit and a sub-step of determining the intensity of the current flowing in the magnetic circuit,
- a sub-step of determining the temperature based on the electrical parameters determined by means of a predetermined model.

A predetermined model, within the meaning of the invention, refers to any graph, any table or any equation that enables to deduce the temperature of the reference thermal point from the electrical parameters (intensity, voltage).

Such a predetermined model may thus be presented in various forms, such as, for example, and not limited to, a correspondence table, a database, an abacus, a digital model, an analytical model, a tabulated digital function, an analytical function, a semi-analytical or semi-digital model.

The predetermined model enables linking, via one-to-one correspondence, the electrical parameters (intensity, voltage) to the temperature in an electric propulsion system.

In an example of an embodiment, a correspondence table is used, which links the ratio values between voltage and current intensity on the one hand, and the corresponding temperature at the reference thermal point on the other hand.

The current in the magnetic circuit is applied by means of a power supply unit of the electric propulsion system, called the PPU ("Power Processing Unit"), for example via a current source, through electrical wiring.

The voltage can be measured either at the terminals of the at least one magnetic winding, or remotely at the power processing unit of the electric propulsion system.

In one embodiment for determining the current flowing in the magnetic circuit, the current intensity is measured. This measurement can be carried out either at the terminals of the at least one magnetic winding, or remotely at the power processing unit of the electric propulsion system.

In another embodiment for determining the current flowing in the magnetic circuit, we use the value of the current intensity applied by the current source, possibly readjusted by a digital model, according to the accuracy of the current control. This, in other words, is a simple reading of the current control value.

The method thus proposes to flow a current in a part that is not dedicated to the thermal measurement as such.

The temperature at the reference thermal point of the electric propulsion system is thus obtained from electrical measurements of the magnetic circuit, which is initially present in the electric propulsion system, particularly for generating a magnetic field in order to enable the generation of the propulsion effect in the electric propulsion system.

Advantageously, no part that is external to the electric propulsion system, of the thermistor or thermocouple type, is therefore required to determine the temperature at the reference thermal point of said electric propulsion system.

Thus, the step of determining the temperature of the electric propulsion system is generically feasible for all types of architectures of electrical wiring between said electric propulsion system and the power processing unit connecting it to the satellite.

The predetermined model, which enables linking the electrical parameters and the temperature at the reference thermal point of the electric propulsion system, has been determined beforehand, particularly according to the type of electric propulsion system.

The predetermined model helps to overcome a number of uncertainties about the parts involved in and around the electric propulsion system in a simple and effective manner. It is thus possible to install electric propulsion systems of different types, with different architectures, on the same satellite and to maintain the same method for determining the temperature, while using a specific predetermined model for each type of propulsion system.

Alternatively, the previously established model can incorporate the impact of the architecture of the electrical wiring between said electric propulsion system and the power processing unit connecting it to the satellite.

The step of determining the temperature at the reference thermal point of the propulsion system, when said point is inside the propulsion system, thus advantageously allows accurately determining the temperature in the heart of the electric propulsion system—and particularly doing so remotely from the electric propulsion system when the voltage and current intensity measurements are taken at the PPU—either during the operating phase of the electric propulsion system, when the extremely high temperature of the electric propulsion system is controlled so that it does not exceed the maximum recommended temperature for the proper operation of the electric propulsion system, or during the stop phase of the electric propulsion system, when the temperature is controlled so that it does not fall below a predetermined minimum temperature.

In particular embodiments, the sub-step of determining the temperature comprises a sub-step of calculating the electrical resistance of the at least one magnetic winding, using the measured voltage values and the determined current intensity values. The predetermined model allows associating the corresponding temperature value with the calculated value of the electrical resistance.

Since the at least one magnetic winding is formed of a coiled conductive wire, resistance of which varies depending on the temperature, the method advantageously uses this feature to determine the temperature at the reference thermal point of the electric propulsion system.

In particular embodiments, the sub-step of determining the temperature comprises a sub-step of calculating the electrical resistivity of the material used for the magnetic circuit from the measured voltage value and the determined current intensity value. The model allows associating the temperature value corresponding with the calculated value of the electrical resistivity.

In particular embodiments, when the electric propulsion system is running, the current applied to determine the temperature is the same as the current applied to the magnetic circuit and adjusted to permit the generation of the propulsion effect of the electric propulsion system.

In particular embodiments, when the electric propulsion system is in the stop phase, the current applied to determine the temperature is fixed or variable. It may, for example, be of lower intensity than the current intensity applied to the magnetic circuit and adjusted to permit the generation of the propulsion effect of the electric propulsion system.

In an example of an embodiment, the current is applied in the magnetic circuit through a current source that is separate from the current source used to generate the magnetic field.

In a preferred example of an embodiment, the current is applied in at least one magnetic winding through the current source used to generate the magnetic field. A lower level of intensity of the current can be applied to limit the power consumption.

This type of embodiment illustrates that the method can advantageously be used outside the operating range of the electric propulsion system.

In particular embodiments, the step of determining the temperature may be accomplished by any means, such as, for example, a temperature measuring equipment of the thermistor or thermocouple type.

In examples of embodiments, the temperature is determined at a reference thermal point on an area of the outer surface of the electric propulsion system. The measurement can therefore be carried out by any means, particularly a temperature measurement equipment of the thermistor or thermocouple type.

DESCRIPTION OF THE FIGURES

The invention will be better understood on reading the description below, given by way of a non-limiting example, and made with reference to FIG. 1 that shows a partial cross-section and perspective view of a Hall-effect propulsion system according to the invention, illustrating its general structure.

For clarity, the parts shown are not to scale, unless stated otherwise.

DETAILED DESCRIPTION OF AN EMBODIMENT OF THE INVENTION

This invention relates to controlling the temperature of an electric propulsion system.

The electric propulsion system is designed to be equipped in a satellite intended to be placed for the purpose of its mission, for example, in a GEO orbit or Low Earth Orbit (LEO).

In the following description, we refer, without actually limiting ourselves, to a Hall-effect propulsion system. Nothing stops us from considering other electric propulsion systems so long as they comprise a magnetic circuit, such as MagnetoPlasmaDynamic (MPD) propulsion systems, High Efficiency Multistage Plasma (HEMP) propulsion systems or Helicon propulsion systems. The Hall-effect propulsion system, referred to as propulsion system 1, shown in a perspective view and in a partial cross-section in FIG. 1, is conventional in itself.

The propulsion system 1 comprises an annular channel, called the discharge channel 2, demarcated by an inner wall 3 and an outer wall 4, which are concentric around a central axis X. The inner wall 3 demarcates a central core 5.

The term "inner" refers to a part closer to the central axis X, and the term "outer" refers to a part further away from the central axis X.

The inner wall 3 and outer wall 4 are preferably made of ceramic material.

The discharge channel 2 has an open downstream end 22 and a closed upstream end 21.

The discharge channel 2 also has, at its upstream end 21, an injection system 10 used to inject propellant gas in the discharge channel 2.

The propellant gas may be xenon, which has the benefits of a high molecular weight and a comparatively low ionization potential.

The terms "upstream" and "downstream" in this context are defined with respect to the normal direction of flow of the propellant gas in the direction defined by the central axis X of the discharge channel.

The propulsion system 1 also comprises a magnetic circuit. This magnetic circuit comprises:
  a first magnetic winding, called the peripheral magnetic winding 20, coiled around the outer wall 4,
  a second magnetic winding, called the central magnetic winding 30, coiled concentrically in the central core 5, close to the inner wall 3.

The central magnetic winding 30 and the peripheral magnetic winding 20 are designed to generate a radial magnetic field in the discharge channel 2, the intensity of which is maximal toward the downstream end 22 of said discharge channel.

Each magnetic winding, the central 30 and the peripheral 20, is constructed using a winding of a conductive wire.

Propulsion systems with dual magnetic windings (peripheral and central) are the most typical configuration.

In one embodiment, the two magnetic windings, the central 30 and the peripheral 20, are connected in series.

In an alternative embodiment, the two magnetic windings, the central 30 and the peripheral 20, are not interconnected.

In another embodiment of the magnetic circuit, said magnetic circuit comprises a single magnetic winding, for example the central magnetic winding.

The propulsion system 1 comprises an electrical circuit 60 comprising an anode 40 located at the upstream end 21 of the discharge channel 2, a cathode 50 located downstream of the open downstream end 22 of the discharge channel 2, and a voltage source 61 between the anode 40 and the cathode 50.

The voltage source is arranged in a power processing unit, called the PPU, which is conventional in itself.

The PPU also supplies current to the magnetic circuit, preferably direct current. Electrical wiring connects the PPU to the magnetic circuit.

In case the two magnetic windings, the central 30 and the peripheral 20, are not interconnected, a different current is supplied to each magnetic winding. The PPU supplies current to the magnetic circuit via two separate current sources (not shown).

In the most frequent case, in which the two magnetic windings, the central 30 and the peripheral 20, are connected in series, the same current is used. The PPU supplies current to the magnetic circuit through a single current source (not shown).

In a first architecture, the current source supplying the magnetic circuit is common to that supplying the anode 40.

In a second architecture, the current source supplying the magnetic circuit is separate from that supplying the anode 40.

The selectivity in the choice of the supplied current is based on the phase of use of the propulsion system 1. Thus, when the propulsion system 1 is in operation, both the magnetic circuit and the anode 40 are powered, whereas when the propulsion system 1 is stopped, only the magnetic circuit is powered. Depending on the chosen architecture, this selectivity in the choice of the supplied current is possible using means known to the person skilled in the art, for example, a switch in the case of the first architecture, and a control circuit of the two sources of current in the second architecture.

While running, an electric voltage is established between the cathode 50 and the anode 40. The cathode 50 then begins to emit electrons in the vicinity of the downstream end 22 of the discharge channel 2. These electrons move, in the discharge channel, towards the injection system 10 under the influence of the electric field generated by the potential difference between the cathode 50 and the anode 40, and are for the most part trapped by the magnetic field B in the vicinity of the downstream end 22 of the discharge channel 2.

The electrons are thus forced to follow circumferential paths in the discharge channel 2, at its open downstream end 22. Propellant gas is injected into the discharge channel 2 via the injection system 10. These electrons then, through shocks, ionize the atoms of the propellant gas flowing from upstream to downstream in the discharge channel 2, thereby creating ions. Moreover, these electrons create an axial electric field E that accelerates these ions from the anode 40 toward the downstream end 22, such that these ions are ejected at high speeds from the discharge channel 2 from its downstream end, which generates a thrust that roughly aligned with the central axis X.

For controlling the temperature of the propulsion system according to the method of the invention, in a first step, the temperature of the propulsion system is determined at a reference thermal point.

In a first example of embodiment of this first step, the temperature is determined at a reference thermal point on an area of an outer surface of the propulsion system, especially on one side of an outer surface of the structure of the propulsion system. The reference thermal point may be located, for example, at the rear of the propulsion system, or on one side of the propulsion system, or at a support structure connecting the propulsion system to the satellite structure or a propulsion system deployment mechanism.

Determining the temperature at the reference thermal point, when said thermal point is located at a connection with the satellite, advantageously provides information on both the propulsion system, to determine if it is too hot or too cold, and the satellite, to avoid damaging it by bringing in contact with a propulsion system that may be too hot.

In a second example of embodiment of the first step, the temperature is determined at a reference point located inside the propulsion system. In other words, the temperature is determined within the propulsion system.

This second example of embodiment, compared to the first example of embodiment, provides a more accurate determination of the temperature of the propulsion system.

To determine the temperature at the reference thermal point, regardless of whether it is inside or on an area of the outer surface of the propulsion system, a current is first applied in the magnetic circuit of the propulsion system.

In the case where the two magnetic windings, the central 30 and the peripheral 20, are not interconnected, a first constant current of a given intensity is applied at the terminals of the central magnetic winding 30 via a first current source, and a second constant current of a given intensity, either identical to or different from that of the first current, is applied to the terminals of the peripheral magnetic winding 20, via a second current source.

In the case where the two magnetic windings, the central 30 and the peripheral 20, are connected in series, a single constant current of a given intensity is applied and powers the central magnetic winding 30 and the peripheral magnetic winding 20, via a current source located in the PPU.

In an example of an embodiment, when the propulsion system 1 is in operation, we draw the benefits of the existing current flowing in the magnetic circuit to generate the appropriate magnetic field for generating propulsion effect. It can either be the current flowing in the central magnetic winding 30, or the current flowing through the peripheral magnetic winding 20, or the current flowing in both—central and peripheral magnetic windings. The current flowing in the magnetic circuit typically has the following values: for electric propulsion systems requiring an electric discharge power between 100 watts and 500 watts, the current intensity is between 1 A and 2 A, and for electric propulsion systems requiring a greater electric discharge power, i.e. between 1.5 kWatts 5 kWatts, the intensity of the current is typically between 4 A and 10 A.

In another example of an embodiment, when the propulsion system 1 is stopped, a current is specifically injected in the magnetic circuit. More particularly, a current is injected either in the central magnetic winding 30 or in the peripheral magnetic winding 20, or in both—central and peripheral magnetic windings. The injected current has a maximum intensity that is much lower than the intensity of the current adjusted to allow generating the propulsion effect. The injected current flowing in the magnetic circuit, in the case where the two magnetic windings, central 30 and peripheral 20, are connected in series, is typically between 1% and 10% of the current adjusted to allow the generation of the propulsion effect. The current value depends, for instance, on the thermal context of the mission, the engine design and the connection with the satellite.

The current can be applied continuously or intermittently, as needed.

Once the current is applied in the magnetic circuit, either in the central magnetic winding 30 or in the peripheral magnetic winding 20, or in both the central 30 and peripheral 20 magnetic windings, electrical parameters of the electric propulsion system are determined.

Preferably, the electrical parameters of the electric propulsion system to be determined are the voltage in the magnetic circuit and the intensity of the current flowing in the magnetic circuit.

In one embodiment, the value of the voltage in the magnetic circuit is measured.

In one embodiment, knowing the intensity of the current applied by the current source, we can choose to use this current intensity value, especially when the control of the current source is considered to be sufficiently accurate. Possibly, in case of inaccuracy of the current source, and following tests or the manufacturer's information, we may use a calibration model to readjust the current intensity values and thereby estimate the value of the effectively applied current more accurately, without needing to actually measure it.

In a preferred alternative embodiment, the value of the intensity of the current flowing in the magnetic circuit is measured, regardless of the value of the intensity of the current applied by the current source. This measure particularly eliminates imperfections or instabilities of the current source and helps obtain an accurate value of the intensity of the current flowing in the magnetic circuit. Furthermore, this measurement is particularly easy to use with sources of current having multiple operating points, as is the case of those used to make the climb to orbit entirely electric.

In one example of an embodiment, the voltage is measured.

In one example of an embodiment, the measurements of the electrical parameters of the propulsion system, the voltage and current intensity, are preferably taken at the power processing unit of the electric propulsion system.

Alternatively, the measurements of the electrical parameters of the propulsion system, the voltage and current intensity, are taken at the terminals of at least one magnetic winding.

Once the electrical parameters are obtained, the temperature at the reference thermal point of the electric propulsion system is determined by means of a predetermined model.

The model takes the measured values of the voltage and current intensity as inputs, and outputs the temperature at the reference thermal point, regardless of whether it is inside or on an area of the outer surface of the electric propulsion system.

In one embodiment, the electrical resistance of the at least one magnetic winding is calculated.

For example, we calculate the electrical resistance associated with this pair of voltage and current intensity values using Ohm's law. Then, using a predetermined model, we associate the corresponding temperature with the calculated value of the electrical resistance.

In this example, the predetermined model takes the calculated value of the electrical resistance as its input and outputs the temperature at the reference thermal point, regardless of whether it is inside or on an area of the outer surface of the electric propulsion system.

When the calculated value of the electrical resistance is not present in the model, an interpolation between two values around the calculated resistance value is used to find the temperature value. The smaller the interval between two successive values, the more accurate the interpolations will be.

In another embodiment, the electrical resistivity of the material constituting the magnetic circuit is calculated.

The electrical resistivity is derived from measuring the voltage in the magnetic circuit, at the terminals of the central magnetic winding 30 and/or the peripheral magnetic winding 20, and the current flowing through it/them and the values of the cross-section of the windings, their length, and the internal architecture of the electric propulsion system. Using the measurement of this electrical resistivity, and knowing the type of material forming the magnetic circuit, it is possible to infer the temperature and, consequently, the temperature at the reference thermal point, regardless of whether it is inside or on an area of the outer surface of the propulsion system.

In this mode, the predetermined model takes the calculated value of the electrical resistivity as its input and outputs the temperature at the reference thermal point of the electric propulsion system.

Whatever the input data of the predetermined model (voltage, current, resistance, resistivity), the model is defined in advance on the ground by means of a series of measurements for each type of electric propulsion system.

In one example of an embodiment, the electric propulsion system is heated. Simultaneously, its temperature is measured using temperature sensors installed at the reference thermal point, either inside or on an area of the outer surface of the electric propulsion system, and the voltage and the intensity of the current in the magnetic circuit are measured.

In the example of an embodiment of a resistance-temperature model, the associated electrical resistance is calculated, for example by using Ohm's law. For each point of temperature measured, it is made to correspond in the model to the value of the measured resistance.

The variation profile of the electrical resistance according to the temperature may not be linear over the entire range of resistance values. Therefore, to maximize the accuracy of the determination of the temperature while also limiting the total number of values in the model, it is possible to create a model with a variable interval: the greater the slope of the resistance-temperature curve, the smaller the interval will be, and the lesser the slope of the resistance-temperature curve, the greater the interval will be.

The model may have been pre-loaded on board the satellite before launch.

It is also conceivable that the model is loaded on the ground and can be interrogated remotely by the satellite. The satellite can thus send to a ground station, either the pair of voltage and current values measured, or the calculated value of the electrical resistance, and then wait for the corresponding temperature value. Therefore, it would be possible to load a large number of values on the ground in the table and save memory on board the satellite. It is also possible a posteriori, once the satellite is launched, to repeat measurements on the ground on certain operating ranges and thereby refine the temperature measurement a posteriori.

The measured temperatures can be very different depending on the operating phases of the propulsion system (in operation, stopped). Alternatively, it is possible to create multiple models, one for each phase of operation of the propulsion system.

A temporal integration of multiple temperature estimates may also determine the direction of variation of the temperature of the electric propulsion system. If a hysteresis effect is noted in terms of increase or decrease in temperature, it will be possible to know what portion of model to choose at all times.

It should be noted that in orbit, the temperature of the power lines connecting the electric propulsion system and the location of the measurement will vary. This line temperature variation results in variations in their resistance and hence introduces uncertainty in estimating the temperature of the propulsion system. This phenomenon can, for example, be corrected simply by estimating or measuring the temperature around these power lines.

Knowing the temperature at the reference thermal point of the propulsion system, regardless of whether it is inside or on an area of the outer surface of the propulsion system, thus enables a reliable monitoring of the thermal behaviour of the electric propulsion system. It then becomes possible to thermally regulate said electric propulsion system optimally, without requiring the addition of measuring equipment of the thermistor or thermocouple type, and their associated acquisition systems.

During an operating phase of the propulsion system, the control of the temperature at the reference thermal point of the propulsion system, either inside or on an area of the outer surface of the propulsion system, helps to ensure that it does not exceed the prescribed maximum temperature.

In case the determined temperature exceeds the prescribed maximum temperature, the propulsion system can be stopped temporarily.

During a stop phase of the propulsion system, the control of the temperature at the reference thermal point of the propulsion system, either inside or on an area of the outer surface of the propulsion system, helps to ensure that it does not fall below a prescribed minimum temperature.

In case the determined temperature falls below the prescribed minimum temperature, the propulsion system is reheated.

In an example of an embodiment, the reheating is produced by the Joule effect. Such reheating may consist of applying a current in the magnetic circuit. The applied current preferably has a peak intensity that is lower than the intensity of the current adjusted to allow the generation of a propulsion effect.

Thus, it is no longer necessary to use a heater with its associated power system, which is conventionally used for heating space propulsion systems.

The temporal integration of multiple temperature estimates allows determining the direction of variation of the temperature of the propulsion system, and also monitoring its rate of change over time. By knowing the thermal inertia of the propulsion system (by prior ground measurements) it is possible to anticipate the triggering of reheating or the stopping of the propulsion system to prevent overheating in orbit.

The invention finds a particularly advantageous application in several thermal control modes of propulsion: either guided by ground control or in an autonomous mode wherein the satellite takes decisions relative to predetermined thresholds or a predetermined plan, independently of the ground control, or in a hybrid mode combining the two above modes and wherein the satellite has a degree of autonomy but also has interactions with ground control. Typical actions included in these modes have been described previously and especially include the current controls, starting a reheating, starting or stopping a propulsion system, control of the temperature of the propulsion system(s).

This invention is not limited to the preferred embodiments described above by way of non-limiting examples and to the discussed variants. It also relates to the embodiment variants within the reach of a person skilled in the field.

The above description clearly illustrates that through its various features and benefits, this invention achieves the goals it had set. In particular, it offers a simple and reliable method for the accurate control of temperature inside or on a region of the outer surface of an electric propulsion system. This method has the advantage of not using any external element to the pair comprising the electric propulsion system and the PPU. In particular, the invention simplifies the integration of the propulsion system in spacecraft by allowing the replacement of acquisition channels (thermistors or thermocouples) and powering the heating equipment by the channels and power supply already present in the PPU. This results in a system that is less expensive, more compact at installation, more accurate and more efficient in operation because it is optimally integrated in the propulsion system.

The invention claimed is:

1. A method for controlling a temperature of an electric propulsion system, the electric propulsion system comprising a discharge channel, an anode, a cathode, an injection system to inject a propellant gas in the discharge channel, and a magnetic circuit comprising at least one magnetic winding to generate a magnetic field in the discharge channel, the method comprising steps of: determining the temperature at a reference thermal point of the electric propulsion system; and heating the electric propulsion system by a Joule effect, through an application of a first current in the magnetic circuit in response to a determination that the temperature at the reference thermal point is below a predetermined minimum temperature during a stop phase of the electric propulsion system.

2. The method for controlling the temperature of the electric propulsion system according to claim 1, further comprising a step of temporarily stopping the electric propulsion system during an operating phase of the electric propulsion system in response to a determination that the temperature at the reference thermal point exceeds a predetermined maximum temperature.

3. The method for controlling the temperature of the electric propulsion system according to claim 1, wherein the step of determining the temperature further comprises steps of: applying a second current in the magnetic circuit; determining electrical parameters of the electric propulsion system by measuring a voltage in the magnetic circuit and determining an intensity of the second current flowing in the magnetic circuit; and determining the temperature based on the electrical parameters as determined utilizing a predetermined model.

4. The method for controlling the temperature of the electric propulsion system according to claim 3, wherein the step of determining the intensity of the second current comprises a step of measuring the second current flowing in the magnetic circuit or reading a current control value.

5. The method for controlling the temperature of the electric propulsion system according to claim 3, wherein the step of determining the temperature based on the electrical parameters as determined comprises a step of calculating an electrical resistance of the at least one magnetic winding by using the voltage as measured and the intensity of the second current as determined, with the predetermined model being used to match the electrical resistance and the temperature.

6. The method for controlling the temperature of the electric propulsion system according to claim 3, wherein the step of determining the temperature based on the electrical parameters as determined comprises a step of calculating an electrical resistivity of a material used to make the magnetic circuit, by using the voltage as measured and the intensity of the second current as determined, with the predetermined model being used to match the electrical resistivity and the temperature.

7. The method for controlling the temperature of the electric propulsion system according to claim 3, wherein during an operating phase of the electric propulsion system, the second current is adjusted to enable a generation of a propulsion effect of the electric propulsion system.

8. The method for controlling the temperature of the electric propulsion system according to claim 3, wherein the second current is constant or variable during the stop phase of the electric propulsion system.

9. The method for controlling the temperature of the electric propulsion system according to claim 1, wherein the temperature is determined at the reference point located on an area of an outer surface of the electric propulsion system.

10. The method for controlling the temperature of the electric propulsion system according to claim 1, wherein the temperature is determined inside the electric propulsion system.

* * * * *